Patented Nov. 4, 1952

2,616,923

UNITED STATES PATENT OFFICE 2,616,923

DINITRODIOLS AND THEIR ALKALI AND ALKALINE EARTH METAL SALTS, AND METHOD OF PREPARATION THEREOF

Herman Plaut, Los Angeles, Calif., assignor to Aerojet Engineering Corporation, Azusa, Calif., a corporation of Delaware No Drawing. Application January 22, 1949, Serial No. 72,258

12 Claims. (Cl. 260—500)

This invention relates to a new composition of matter and in particular to a new class of organic compounds.

The object of this invention is to provide organic compounds containing two nitro groups in the molecule, and having two other functional groups, which in this particular series are hydroxyl groups.

A further object of this invention is the development of processes for synthesizing this class of compounds.

Heretofore, many attempts have been made to produce compounds having two nitro groups in conjunction with two other functional groups in the same molecule. Up to the present time, however, compounds such as those described in this application have been unknown.

According to my invention, I have succeeded in making compounds belonging to a series having the general formula

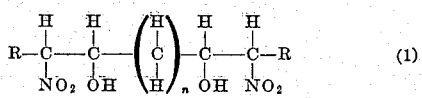   (1)

in which R may comprise either hydrogen, halogen, alkyl groups, aryl groups heterocyclic groups or combinations of the above groups; and the value of n on the outside of the parenthesis on the central

group may be a whole number including zero. The alkyl, aryl, heterocyclic groups, etc., may be substituted in part by one of the following radicals, halogen, hydroxyl, nitro, sulphonic, carbonyl, ether, carboxyl, amino, or combinations of these groups. Compounds having this general formula are extremely valuable as intermediates since they possess functional groups which may be made to react in a large number of ways thereby permitting the synthesis of many new or otherwise difficultly obtainable substances.

In general these compounds are prepared by admixing a nitro compound in which the nitro group is attached to an aliphatic carbon and which may be represented by the general formula

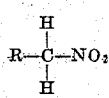

in which R may represent either hydrogen, halogen, alkyl groups, aryl groups, heterocyclic groups or any combination of the above groups, with a dialdehyde having the general formula

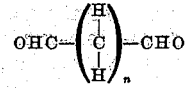

in which the value of $n$ may be a whole number including zero. The nitro compounds that are most readily available are the nitro paraffins such as nitromethane, nitroethane, etc. The dialdehyde most available is glyoxal and in cases where this substance is used the value of $n$ in the dialdehyde formula is zero.

The method by which this series of compounds, hereafter referred to as the dinitrodiols, is prepared, is set forth briefly in the following procedure. However, this invention is not limited to this procedure, but will include any other method which anyone skilled in the art would recognize as complying with the same general description as the following:

A solution is made of nitro compounds and dialdehyde in such proportions as are required by the materials chosen. In most cases a ratio of two molecular weights of the nitro compound are added to the one molecular weight of the dialdehyde. At times, however, it is advantageous to employ an excess of the nitro compound. The mixture of the nitro compound and the dialdehyde is agitated and an alkaline solution is added thereto. The quantity of the alkali required depends on the nitro compound and the dialdehyde selected, and may vary from a trace to a ratio of two molecular weights of the alkali to one molecular weight of the dialdehyde. The temperature is controlled so that it does not rise above +50° C. although the temperature at which it is preferred to conduct the reaction is approximately 10° C.

When the nitro compound-dialdehyde solution and the alkali have been thoroughly mixed, agitation is discontinued and the temperature of the reaction mixture is permitted to attain room temperature. After standing for a period of time the alkali is neutralized by employing a weak acid and the dinitrodiol is extracted with an appropriate solvent.

The extract is then dried and the solvent removed leaving a residue of dinitrodiol which may be purified by recrystallization if desired.

The salts of the dinitrodiol can usually be obtained directly from the reaction products after the agitation and before acidification. The substances may be purified by employing any of the various techniques which are commonly known to anyone skilled in the art.

The dialdehyde that is most generally available, as stated above, is glyoxal. This compound is obtainable in the form of an aqueous solution which contains approximately 30% glyoxal. Whenever an aqueous solution of the dialdehyde is employed it is preferred to add a solvent which will create a homogeneous solution of the aqueous aldehyde solution and the nitro compound. Such solvents include the water-soluble alcohols such as methanol, propanol, ethanol, propyl, isopropyl and tertiary butyl alcohol, etc., and other water-miscible solvents such as dioxane, acetone, etc.

The alkali that is used to cause the reaction between the dialdehyde and the nitro compound may be any of the carbonates, oxides or hydroxides of alkali metals such as sodium, potassium, lithium, or the alkaline-earth metals such as calcium, strontium, barium, etc.

Acid suitable for freeing the dinitrodiol from its alkali or alkaline earth metal salt is an acid having a low degree of ionization such as organic acids and weak inorganic acids. Examples of the organic acids are tartaric, acetic, oxalic, etc. Examples of the weak inorganic acids are sulphurous, phosphoric and other acids having a similar degree of ionization.

The following specific examples illustrate the application of this invention:

EXAMPLE I

Formation of 1,4-dinitro-2,3-butanediol

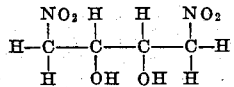

A half-mole of nitromethane, 30.5 gms., is added to 47.5 gms. of 30% glyoxal solution, which represents approximately 0.25 mole of glyoxal; a small amount of methanol, approximately 30-50 cc. is added to the glyoxal solution to help bring the nitroparaffin into solution. The temperature of the solution is lowered to 10° C. by external cooling, and vigorous agitation is maintained during this stage of the process.

Twenty gms. of sodium hydroxide dissolved in 30 ml. of water are then slowly added to the cooled mixture and agitation is continued during the addition of the alkali (15-30 min.). The entire mixture is stirred for one hour after all the alkali has been added, and then the mixture is allowed to stand overnight at room temperature. A brown precipitate is formed during this period which consists of the disodium salt of 1,4-dinitro-2,3-butanediol and higher condensation products. The mixture is then again cooled to 10° C. and agitated and a solution of 30 gms. (0.5 mole) of glacial acetic acid in 30 cc. of water are added slowly until all the alkali has been neutralized. A precipitate forms which is removed by filtration. The solid is washed in the filter with several portions of warm water and the separate portions of wash water are added to the original filtrate. The filtrate is then extracted with four 100 cc. portions of nitromethane. The nitromethane solution is then dried over anhydrous sodium sulfate and when thoroughly dried the nitromethane is then removed by evaporation at reduced pressure. The residue consists essentially of 1,4-dinitro-2,3-butanediol which may be purified by recrystallization from 1-chloro-1-nitroethane. The resulting product melts at 134° C.

The calculated nitrogen value of 1,4-dinitro-2,3-butanediol is 15.56% nitrogen and the nitrogen content of the resulting recrystallized compound obtained above was found to be on ultimate analysis 15.20% nitrogen.

EXAMPLE II

Alternative formation of 1,4-dinitro-2,3-butanediol

A solution is prepared containing 193 gms. (1 mole) 30% aqueous glyoxal with 366 gms. (6 moles) nitromethane and 200 cc. of methanol. The solution is cooled to 10° C. and stirred while a solution of 80 gms. (2 moles) sodium hydroxide dissolved in 125 ml. of water is added over a one-half hour period. The liquid mass forms two phases after all of the alkali is added. The temperature is allowed to rise to room temperature and the mixture is stirred continuously for an additional two hours. A heavy precipitate drops out. The precipitate is then collected, suspended in water, and treated as described below, or the entire reaction mixture may be used if desired.

The reaction mixture, or the precipitate suspended in water, is cooled to 10° C. and a rapid stream of sulphur dioxide is passed into the solution until the solution becomes saturated. Any undissolved material is then removed by filtration and the filtrate is extracted with four 150 cc. portions of nitromethane. The separated nitromethane is then dried over anhydrous sodium sulfate and the solvent is then evaporated under reduced pressure. The 1,4-dinitro-2,3-butanediol is obtained as a residue. This material can be recrystallized by dissolving in 1-chloro-1-nitroethane and permitting it to recrystallize therefrom. The yield obtained by this procedure is about 24% based on the glyoxal used.

EXAMPLE III

Formation of 2,5-dinitro-3,4-hexanediol

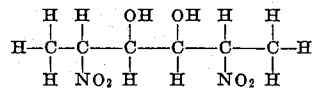

The procedure for making this product has been divided for convenience into two separate steps A and B.

A. PREPARATION OF THE DISODIUM SALT 28.5 gms. (0.5 moles) of nitroethane are added to 47.5 gms. (0.25 moles) of an aqueous solution containing 30% glyoxal. 75 cc. of methanol are added to the mixture. The solution is then cooled to 10° C.

A solution containing 20 gms. (0.5 moles) of sodium hydroxide in 40 cc. of water is then added slowly to the above mixture, which is agitated vigorously during the period of addition. After the addition of the alkali has been completed, agitation is discontinued and the temperature is permitted to rise slowly to room temperature. The resultant solution is set aside for a period of four hours during which time a fine, powdery precipitate of disodium-2,5-dinitro-3,4-hexanediol separates out. This precipitate is filtered and washed several times on the filter with methanol. A yield of approximately 90% of disodium salt of 2,5-dinitro-3,4-hexanediol was obtained by this method.

B. PRODUCTION OF FREE DINITRODIOL

The disodium salt prepared in accordance with procedure of Example IIA is suspended in water and sulphur dioxide is passed into the water until a saturated solution has been formed. The temperature is maintained at 10° C., or lower, throughout this stage of the process. The entire mixture is then extracted with three 100 ml. portions of ether. After drying the combined ether extracts over anhydrous sodium sulphate, the ether is evaporated under reduced pressure leaving behind the dinitrohexanediol as the residue. The weight of the purified dinitrodiol is usually between 30–40% based on the original weight of the sodium salt. The material may be further refined by recrystallization, if desired.

To refine the crude 2,5-dinitro-3,4-hexanediol the crystals obtained from the above procedure are dissolved in a minimum amount of acrylonitrile and refluxed therewith. Any insoluble matter that is left after refluxing is filtered out and twice the total volume of the solution of chloroform is added to the mixture and the total mass is cooled. White crystals of 2,5-dinitro-3,4-hexanediol separates out from this solution. The melting point of the crystals obtained by this manner varies between 149–150° C.

The calculated nitrogen content of 2,5-dinitro-3,4-hexanediol is 13.33% nitrogen. On analysis the nitrogen content of the crystalline material produced from the above procedure was found to be 12.97% which agrees with the theoretical value given above. Derivatives were also made from the crystalline material obtained which verified the structural formula.

EXAMPLE IV

*Formation of 3,6-dinitro-4,5-octanediol*

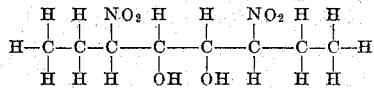

Two moles of 1-nitropropane are reacted with one mole of glyoxal. The remainder of the procedure is similar to that employed in Example III. The product obtained in this manner is 3,6-dinitro-4,5-octanediol.

The following equations set forth the manner in which this product is formed:

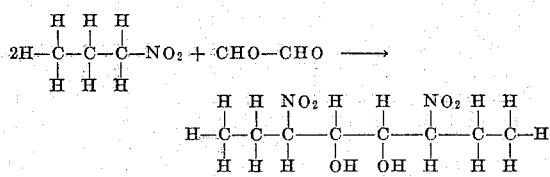

This compound may be prepared either as the salt or converted into the free dinitrodiol.

EXAMPLE V

*Preparation of 1,4-diphenyl-1,4-dinitro-2,3-butanediol*

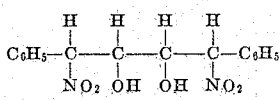

In this example phenylnitromethane was substituted for the nitromethane used in Example I and reacted with glyoxal following the same procedure described above.

The equations for this reaction are given as follows:

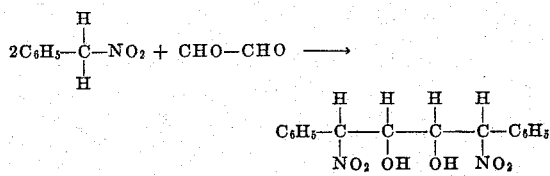

EXAMPLE VI

*Formation of 2,7-dinitro-3,6-octanediol*

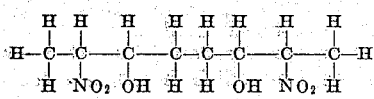

This compound is formed by substituting succinyl aldehyde for the glyoxal used in Example II. The reactions in this particular instance are as follows:

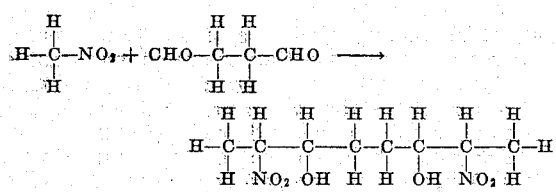

The salts of dinitrodiol other than the alkali metal salts, alkaline-earth metal salts, and ammonium salts, may be prepared from the free diol or from the alkali metal, alkaline-earth metal or ammonium salts. The reaction showing the formation of these salts by the latter method is set forth in the following equation:

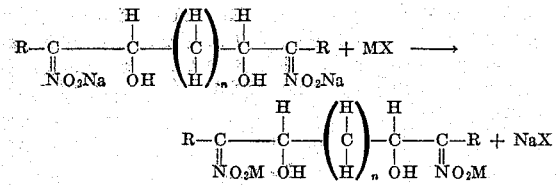

where R corresponds to the same radical as represented by R in Formula 1 above, X may be a halogen ion, sulfate ion, nitrate ion, or any ion with which M forms a water soluble salt, and M represents one valence of any cation.

It is readily seen that the compounds made possible by my invention provide substances which contain many active groups that may be easily substituted and therefore make available a class of materials that are suitable intermediates for the formation of a large number of unknown compounds, or compounds which up to now have been very difficult to produce.

I claim:

1. A new composition of matter comprising dinitrodiols having structural formula corresponding to:

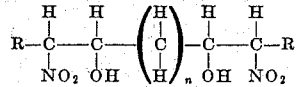

in which R represents a group selected from the class consisting of hydrogen, alkyl groups and aryl groups; and in which $n$ may be a whole number including zero.

2. A new composition of matter comprising dinitrodiols having a structural formula corresponding to

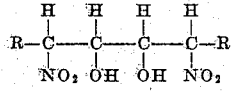

in which R represents groups selected from the class consisting of hydrogen, alkyl groups and aryl groups.

3. A new composition of matter comprising 2,5-dinitro-3,4-hexanediol.

4. A new composition of matter comprising 1,4-dinitro-2,3-butanediol.

5. A new composition of matter comprising 3,6-dinitro-4,5-octanediol.

6. A new composition of matter comprising 1,4-diphenyl-1,4-dinitro-2,3-butanediol.

7. A new composition of matter comprising 2,7-dinitro-3,6-octadanediol.

8. A new composition of matter comprising salts of the dinitrodiols having a structural formula

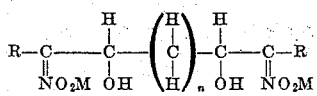

in which M is one valence of a cation selected from the group consisting of ammonium, amine radicals and metals; in which R represents a group selected from the class consisting of hydrogen, alkyl groups and aryl groups; and in which $n$ may be a whole number including zero.

9. A process for preparing dinitrodiols which comprises reacting a mono-nitro compound in which the nitro group is attached to an aliphatic carbon and having the general formula

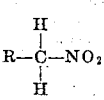

wherein R may be a radical selected from the group consisting of hydrocarbon, alkyl groups and aryl groups, with an aldehyde selected from the group of compositions having the general formula

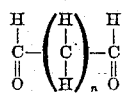

in which $n$ may be a whole number including zero, in the presence of a catalyst selected from the group consisting of oxides, carbonates, hydroxides of alkali metals and alkaline-earth metals, permitting the solution to stand until reaction has taken place, adding to the reaction mixture a weak acid selected from the group consisting of acetic acid, oxalic acid, tartaric acid, sulphurous acid and phosphoric acid, extracting the dinitrodiol with an appropriate solvent, removing the solvent and obtaining the dinitrodiol as a residue.

10. A process for preparing dinitrodiols which comprises reacting a mono-nitro compound in which the nitro group is attached to an aliphatic carbon and having the general formula

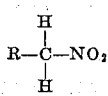

wherein R may be a radical selected from the group consisting of hydrogen, alkyl groups and aryl groups, with glyoxal

in the presence of a catalyst selected from the group consisting of oxides, carbonates, hydroxides, alkali metals and alkaline-earth metals, permitting the solution to stand until reaction has taken place, adding to the reaction mixture a weak acid selected from the group consisting of acetic acid, oxalic acid, tartaric acid, sulphurous acid and phosphoric acid, extracting the dinitrodiol with an appropriate solvent, removing the solvent and obtaining the dinitrodiol as a residue.

11. The process for preparing the alkali and alkaline-earth metal salts of the dinitrodiols which comprises reacting a mono-nitro compound in which the nitro group is attached to an aliphatic carbon and having the general formula

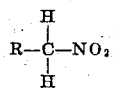

wherein R may be a radical selected from hydrogen, alkyl and aryl groups with a dialdehyde having the general formula

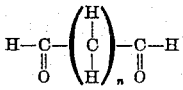

in which the value of $n$ may be a whole number from zero on up using as the catalyst the metal whose salt it is desired to make, said metal being employed as a compound selected from the group consisting of oxide carbonate and hydroxide.

12. The process for preparing the alkali and alkaline-earth metal salts of the dinitrodiols which comprises reacting a mono-nitro compound in which the nitro group is attached to an aliphatic carbon and having the general formula

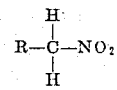

wherein R may be a radical selected from hydrogen, alkyl groups and aryl groups with the dialdehyde glyoxal,

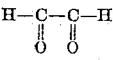

using as the catalyst the metal whose salt it is desired to make, said metal being employed as a compound selected from the group consisting of oxide carbonate and hydroxide.

HERMAN PLAUT.

REFERENCES CITED

The following references are of record in the file of this patent:

UNITED STATES PATENTS

| Number | Name | Date |
| --- | --- | --- |
| 2,132,330 | Vanderbilt | Oct. 4, 1938 |
| 2,139,120 | Hass et al. | Dec. 6, 1938 |
| 2,472,550 | Smith et al. | June 7, 1949 |

OTHER REFERENCES

Journal of Industrial and Engineering Chemistry, January 1940, pages 34–38 (Vanderbilt and Hass).